US006242503B1

(12) United States Patent
Kozma et al.

(10) Patent No.: US 6,242,503 B1
(45) Date of Patent: Jun. 5, 2001

(54) POLYMER ARTICLES INCLUDING MALEIC ANHYDRIDE AND ETHYLENE-VINYL ACETATE COPOLYMERS

(75) Inventors: Matthew L. Kozma; John D. Bambara, both of Osterville; Robert F. Hurley, Centerville; Scott C. Smith, Osterville, all of MA (US)

(73) Assignee: Sentinel Products Corp., Hyannis, MA (US)

( * ) Notice: Subject to any disclaimer, the term of this patent is extended or adjusted under 35 U.S.C. 154(b) by 0 days.

(21) Appl. No.: 09/301,490

(22) Filed: Apr. 28, 1999

Related U.S. Application Data

(60) Division of application No. 09/003,223, filed on Jan. 6, 1998, which is a continuation-in-part of application No. 08/749,740, filed on Nov. 15, 1996, now Pat. No. 5,883,144.

(51) Int. Cl.[7] ................................. C08F 8/00; C08F 2/46
(52) U.S. Cl. ......................... 521/193; 521/134; 522/109; 522/120
(58) Field of Search ............................ 525/193; 521/134; 522/109, 120

(56) References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 3,067,147 | 12/1962 | Roberts et al. . |
| 3,098,831 | 7/1963 | Carr et al. . |
| 3,098,832 | 7/1963 | Pooley et al. . |
| 3,287,477 | 11/1966 | Vesilind . |
| 3,335,892 | 8/1967 | Hildreth . |
| 3,379,802 | 4/1968 | Raley et al. . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,539,473 | 11/1970 | Simpson et al. . |
| 3,644,230 | 2/1972 | Cronin . |
| 3,645,992 | 2/1972 | Elston . |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muori et al. . |
| 3,755,208 | 8/1973 | Ehrenfreund . |
| 3,808,300 | 4/1974 | Miyamoto et al. . |
| 3,814,779 | 6/1974 | Wiley . |
| 3,886,100 | 5/1975 | Yasuda et al. . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojri et al. . |
| 3,966,381 | 6/1976 | Suh . |
| 3,976,530 | 8/1976 | Callan . |

| | | |
|---|---|---|
| 4,048,275 | 9/1977 | Usamoto et al. . |
| 4,058,583 | 11/1977 | Glander et al. . |
| 4,080,344 | 3/1978 | Ikeda et al. . |
| 4,102,829 | 7/1978 | Wantanabe et al. . |
| 4,110,269 | 8/1978 | Ehrenfruend . |
| 4,117,195 | 9/1978 | Swarbrick et al. . |
| 4,142,956 | 3/1979 | Shikinami et al. . |
| 4,163,085 | 7/1979 | Kuhnel et al. . |
| 4,181,762 | 1/1980 | Benedyk . |
| 4,182,398 | 1/1980 | Salyer et al. . |
| 4,203,815 | 5/1980 | Noda et al. . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fujimoto et al. . |
| 4,303,756 | 12/1981 | Kajimura et al. . |
| 4,303,757 | 12/1981 | Kajimura et al. . |
| 4,337,321 | 6/1982 | Allada . |
| 4,347,329 | 8/1982 | Park . |
| 4,379,859 | 4/1983 | Hirosawa et al. . |
| 4,389,514 | 6/1983 | Schmidle et al. . |
| 4,429,059 | 1/1984 | Ozutsumi et al. . |
| 4,433,029 | 2/1984 | Senda et al. . |
| 4,444,948 | 4/1984 | Hockstrasser et al. . |
| 4,446,254 | 5/1984 | Nakae et al. . |
| 4,448,901 | 5/1984 | Senda et al. . |
| 4,451,417 | 5/1984 | Akiyama et al. . |
| 4,464,425 | 8/1984 | Voigt et al. . |
| 4,504,534 | 3/1985 | Adachi et al. . |
| 4,510,031 | 4/1985 | Matsumura et al. . |
| 4,515,907 | 5/1985 | McCullough et al. . |
| 4,526,930 | 7/1985 | Keogh . |

(List continued on next page.)

FOREIGN PATENT DOCUMENTS

| | | |
|---|---|---|
| 0 584 927 A2 | 7/1983 | (EP) . |
| 0 632 077 A2 | 1/1995 | (EP) . |
| 0 702 032 A2 | 3/1996 | (EP) . |
| 62-081429 | 4/1987 | (JP) . |
| WO 90/03414 | 4/1990 | (WO) . |
| WO 92/14784 | 9/1992 | (WO) . |
| WO 93/03093 | 2/1993 | (WO) . |
| WO 93/25617 | 12/1993 | (WO) . |
| WO 96/20977 | 7/1996 | (WO) . |
| WO 97/35910 | 10/1997 | (WO) . |

OTHER PUBLICATIONS

Park, "Handbook of Polymeric Foams and Foam Technology, Polyolefin Foam," Oxford University Press, Chapter 9 pp. 156–242.

Research Disclosure, 40126 Maleic Anydride (MAn)–Grafted Ethylene Vinyl Acetate (EVA), Sep. 1997.

*Primary Examiner*—Morton Foelak
(74) *Attorney, Agent, or Firm*—Fish & Richardson P.C.

(57) ABSTRACT

Polymer articles including ethylene-vinyl acetate and maleic anhydride are described. The ethylene-vinyl acetate can be a high vinyl acetate content ethylene-vinyl acetate. The articles include foamed articles and non-foamed articles. The foamed articles have improved characteristics and properties, such as surface bonding properties.

44 Claims, No Drawings

U.S. PATENT DOCUMENTS

| | | |
|---|---|---|
| 4,542,164 | 9/1985 | Nishioka et al. . |
| 4,554,293 | 11/1985 | Park . |
| 4,581,383 | 4/1986 | Park . |
| 4,591,606 | 5/1986 | Bergstrom . |
| 4,605,682 | 8/1986 | Park . |
| 4,652,588 | 3/1987 | Park . |
| 4,663,361 | 5/1987 | Park . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. . |
| 4,714,716 | 12/1987 | Park . |
| 4,739,547 | 4/1988 | Tanaka et al. . |
| 4,759,992 | 7/1988 | Tomko et al. . |
| 4,762,860 | 8/1988 | Park . |
| 4,791,143 | 12/1988 | Tanaka et al. . |
| 4,818,789 | 4/1989 | Tomko et al. . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,927,888 | 5/1990 | Strait et al. . |
| 4,937,284 | 6/1990 | Bergström . |
| 4,937,299 | 6/1990 | Ewen et al. . |
| 4,958,770 | 9/1990 | Mitchell . |
| 4,960,830 | 10/1990 | Hazelton et al. . |
| 5,026,736 | 6/1991 | Pontiff . |
| 5,030,662 | 7/1991 | Banerjie . |
| 5,047,476 | 9/1991 | Keogh . |
| 5,053,446 | 10/1991 | Salyer . |
| 5,064,802 | 11/1991 | Stevens et al. . |
| 5,064,903 | 11/1991 | Peiffer . |
| 5,086,121 | 2/1992 | Hazelton et al. . |
| 5,093,206 | 3/1992 | Schoenbeck . |
| 5,112,919 | 5/1992 | Furrer et al. . |
| 5,151,204 | 9/1992 | Stuglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,246,783 | 9/1993 | Spenadel et al. . |
| 5,247,018 | 9/1993 | Maeda et al. . |
| 5,268,115 | 12/1993 | Gutierrez et al. . |
| 5,270,377 | 12/1993 | Otawa et al. . |
| 5,272,236 | 12/1993 | Lai et al. . |
| 5,275,747 | 1/1994 | Gutierrez et al. . |
| 5,277,833 | 1/1994 | Song et al. . |
| 5,278,264 | 1/1994 | Spaleck et al. . |
| 5,278,272 | 1/1994 | Lai et al. . |
| 5,288,762 | 2/1994 | Park et al. . |
| 5,304,580 | 4/1994 | Shibayama et al. . |
| 5,314,934 | 5/1994 | Tomka . |
| 5,318,649 | 6/1994 | Nishino et al. . |
| 5,322,728 | 6/1994 | Davey et al. . |
| 5,329,033 | 7/1994 | Spaleck et al. . |
| 5,340,840 | 8/1994 | Park et al. . |
| 5,345,002 | 9/1994 | Song et al. . |
| 5,350,817 | 9/1994 | Winter et al. . |
| 5,366,647 | 11/1994 | Gutierrez et al. . |
| 5,369,136 | 11/1994 | Park et al. . |
| 5,376,428 | 12/1994 | Palazzotto et al. . |
| 5,380,810 | 1/1995 | Lai et al. . |
| 5,382,698 | 1/1995 | Song et al. . |
| 5,385,972 | 1/1995 | Yamamoto et al. . |
| 5,387,620 | 2/1995 | Park et al. . |
| 5,391,629 | 2/1995 | Turner et al. . |
| 5,407,965 | 4/1995 | Park et al. . |
| 5,408,004 | 4/1995 | Lai et al. . |
| 5,414,039 | 5/1995 | Watson et al. . |
| 5,441,999 | 8/1995 | Jarvis et al. . |
| 5,461,110 | 10/1995 | Arthurs et al. . |
| 5,462,975 | 10/1995 | Yamamoto et al. . |
| 5,519,076 | 5/1996 | Odaira et al. . |
| 5,565,051 | 10/1996 | Marzola et al. . |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |
| 5,656,675 * | 8/1997 | Kobayashi et al. .................... 521/79 |
| 5,717,000 * | 2/1998 | Karande et al. ....................... 521/83 |
| 5,767,814 | 6/1998 | Bae et al. . |
| 5,824,746 * | 10/1998 | Harris et al. .......................... 525/196 |
| 5,880,241 * | 3/1999 | Brookhart et al. .................... 526/348 |

\* cited by examiner

POLYMER ARTICLES INCLUDING MALEIC ANHYDRIDE AND ETHYLENE-VINYL ACETATE COPOLYMERS

CROSS REFERENCE TO RELATED APPLICATIONS

This application is a divisional application of U.S. Ser. No. 09/003,223, filed Jan. 6, 1998, which is a continuation-in-part of U.S. Ser. No. 08/749,740, filed Nov. 15, 1996 U.S. Pat. No. 5,883,144.

BACKGROUND OF THE INVENTION

The invention relates to foamed articles and non-foam flexible materials formed from ethylene-vinyl acetate copolymers and maleic anhydride.

Ethylene-vinyl acetate (EVA) copolymers provide materials that can be processed like other thermoplastics, but which approach a rubbery character in softness and elasticity. EVA copolymers are generally soft materials. However, materials containing EVA copolymers can be difficult to process due to the tackiness of the material.

Generally, polymer materials can be used to produce a variety of articles including foams. Foamed polymeric materials have a variety of uses. For example, natural rubber latex foams provide soft materials for body contact and the application of cosmetics. Polyvinyl chloride (PVC) plastisol foams can have a soft, durable feel that simulates leather to the touch. Open cell foams based on polyurethanes have been made suitable for many applications, such as cushions for packaging, automotive applications, home bedding, filters (e.g., for air conditioners), applicators (e.g., for shoe polish), or sound attenuating panels (e.g., for rooms or speakers).

SUMMARY OF THE INVENTION

In one aspect, the invention features a polymer article including a mixture having a maleic anhydride grafted component and an ethylene-vinyl acetate copolymer. A portion of the mixture is cross-linked (e.g., sufficiently crosslinked to form a flexible polymer article having low tackiness). The mixture can be foamed or non-foamed. In non-foamed articles, the maleic anhydride grafted component can be a polyolefinic polymer.

In another aspect, the invention features a method of making a polymer article. The method includes providing a mixture including an ethylene-vinyl acetate copolymer and maleic anhydride, and cross-linking the mixture sufficiently to form the polymer article. The maleic anhydride is grafted to a portion of the mixture. The mixture can be expanded to form a foamed article. The cross-linking can be peroxide, silane cross-linking, radiation cross-linking, or combinations thereof. The peroxide can be dicumyl peroxide.

The polymer article generally has low tackiness and is flexible. The mixture can include an ethylene-vinyl acetate copolymer, a polyolefinic polymer, or a mixture thereof.

A polymer article having low tackiness has a low degree of self sticking. In other words, a low tackiness material substantially does not stick to itself. Foamed materials having low tack do not block. For example, the materials do not block when surfaces of two foam pieces slide over each other without sticking to each other.

A flexible article bends readily without cracking or permanently deforming. The flexibility of an article can be tested by measuring the compression deflection of the article according to ASTM-3575.

The vinyl acetate content of the ethylene-vinyl acetate copolymer can be between about 9 and about 60 percent, preferably between about 15 and about 50 percent, and more preferably between about 15 and about 35 percent.

The polyolefinic polymer can be grafted with maleic anhydride. In other embodiments, the ethylene-vinyl acetate copolymer can be grafted with maleic anhydride. The method can include grafting maleic anhydride to the polyolefinic polymer, the ethylene-vinyl acetate copolymer, or combinations thereof.

The article can include between about 1 and about 90 weight percent of a maleic anhydride grafted polyolefinic polymer, preferably between about 5 and about 30 weight percent, and more preferably between about 5 and about 15 weight percent. The maleic anhydride content of the grafted polyolefinic polymer can be between about 0.01 and about 10 weight percent, preferably between about 0.5 and about 2.0 weight percent.

In preferred embodiments, the article is a foamed article. The foamed article can be an open cell or closed cell foam. The article can have a foam density between about 1.5 and 50 pounds per cubic foot. When the article is a closed cell foam, the foam can have a 25% compression deflection of less than 3 psi. In other preferred embodiments, the article is non-foamed. The non-foamed article is flexible and has low tackiness. The foamed and non-foamed article can be suitable for use in, for example, wire and cable applications. The article can be a bead or particulated foam.

The article can be expanded to form a foam. Expansion of the mixture can include free expansion or compression molding of the mixture. Expanding can take place before cross-linking, during cross-linking, and/or after cross-linking. Compression molding can include the steps of pressing the polymer mixture using a high tonnage press at a temperature of between 240 and 480° F. (e.g., between 275 and 320° F.) and a pressure of between 50 and 5000 psi (e.g., between 250 and 2500 psi) for between 20 and 90 minutes followed by heating the polymer mixture at a temperature between 300 and 380° F.

The foamed material can be crushed after expansion to form an open cell foamed article. A coating, an adhesive, or a laminated layer can be applied to a surface of then article, or the article can be dipped to form a layer on the surface of the article.

The mixture can include other resins, foaming agents, cross-linking agents, activators (e.g., between 0.1 and 5 weight percent), foaming agents (e.g., between 2 and 50 weight percent), particulate fillers, fibrous fillers, antioxidants, ultraviolet stabilizers, thermal stabilizers, pigments and colorants, cell-growth nucleants such as talc, cell-structure stabilizers such as fatty acids or amides, property-modifiers, processing aids, additives, fire retardants, antistatic components, antimicrobial components, or catalysts to accelerate cross-linking and other reactions.

In another aspect, the invention features a method of manufacturing a foamed polymer article. The method includes providing a mixture including an ethylene-vinyl acetate copolymer and maleic anhydride grafted to a portion of the mixture, cross-linking the mixture sufficiently to form a flexible polymer article having low tackiness, and expanding the mixture to form a foamed polymer article in a vertical oven. The cross-linking can be silane, peroxide, or irradiation cross-linking, or a combination thereof. The foamed polymer article has a thickness between about 0.015 and ⅝ inch and a density between about 1.5 and 40 pounds per cubic foot. The method can include applying an adhesive to a surface of the foamed polymer article. The maleic anhydride can improve bonding to the adhesive.

An open cell foam is a foam where there is an interconnection between cells in the foam. There can be greater than about 10 percent open cells (i.e., between 10 and 50 percent) in an open cell foam article, preferably greater than 40 percent, more preferably greater than 80 percent, and most preferably greater than 90 percent. The amount of open cells in a foam can be increased by crushing the foam. A crushed open cell foam can have between 50 and about 98 percent open cells.

A closed cell foam has a predominance of closed cells. For example, a preferred closed cell foam can have 70% or greater closed cells.

The open cell content of a foam can be determined by measuring the amount of water that is absorbed into the foam when the foam is immersed in water. Another method is a gas-volume method using a pycnometer, such as a Quantachrome Model 1000 pycnometer, which measures the percentage of open cells according to method ASTM D-2858.

A low-density polyethylene, or LDPE, is a polymer of ethylene with a density typically between 0.915 and 0.930 g cm$^{-3}$. LDPE resin densities directly relate to the resulting bulk property stiffness. This can limit the degree of mechanical flexibility in foam structures thereof since the lower limit of secant moduli for LDPE is about 20 ksi. While processability of LDPE is quite good, the physical properties, in particular the tensile strength, low-temperature flexibility and toughness, are less than would be obtained from a linear low density polyethylene (LLDPE), due in part to the substantially non-linear nature of LDPE and the profusion of long-chain branches. Since LDPE is prepared under, for example, free-radical conditions and high pressures, it is highly branched. Highly branched polymers are polymers that have approximately one to two short chain branches for every one hundred carbon atoms in the polymer backbone. A short-chain branch is a branch of a polymer backbone of 6 carbon atoms or less which can be quantified by $^{13}$C NMR spectroscopic methods. See, for example, Randall, *Rev. Macromol. Chem. Phys.*, C29 (2 & 3), p. 285–297, incorporated herein by reference.

Conventional linear low density polyethylene (LLDPE) exhibits physical properties which are superior to that of LDPE at about the same range of resin densities, but show somewhat higher secant moduli and are difficult to process, resulting in foams with poor cell structure and higher than desired foam structure densities. LLDPE resins, produced by conventional Ziegler transition metal catalysts in the copolymerization of ethylene with one or more alpha-unsaturated monomers, can exhibit considerably narrower molecular weight distributions than LDPE, higher molecular weights, and typically only about 15–20 short-chain branches per 1000 carbon atoms. Commercially-available LLDPE resins with densities below about 0.910 g cm$^{-3}$ are unavailable, thus further limit the flexibility of foam structures thereof.

Very low density polyethylene (VLDPE) is a special subset of LLDPE wherein an even greater number of "short-chain branches" (ca. 30–50 per 1000 carbon atoms) are effected by appropriate level of comonomer to result in much lower resin densities than LLDPE, e.g. 0.88 g cm$^{-3}$ to 0.91 g cm$^{-3}$. These materials thus exhibit greater flexibility than LLDPE. However, generally with conventional linear polyolefins, the greater the number of short-chain branches, the lower the resulting resin density, but also the shorter the length of the molecular backbone.

A single-site initiated polyolefin resin is a polyolefin prepared from a single-site initiator that has controlled molecular weights and molecular weight distributions. The polyolefin can be polyethylene or a copolymer of ethylene and alpha-unsaturated olefin monomers. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which is incorporated herein by reference. These initiators, particularly those based on group 4 transition metals, such as zirconium, titanium, or hafnium, are high activity ethylene polymerization initiators.

A copolymer is a polymer resulting from the polymerization of two or more monomeric species and includes terpolymers (e.g., resulting from the polymerization of three monomeric species), sesquipolymers, and greater combinations of monomeric species.

The densities, or specific gravities, of the polymer resins can be measured using ASTM D-792 methods.

Maleic anhydride-grafting is covalently bonding one or more maleic anhydride groups to the original polymer chains. The grafting is generally accomplished by forming active grafting sites on the original polymer chain in the presence of maleic anhydride which can react to form a covalent bond between the polymer and the maleic anhydride. Active grafting sites can be generated, for example, by radicals or anions.

High vinyl acetate content EVA copolymers have vinyl acetate contents of greater than 8 percent, preferably greater than 17 percent and more preferably greater than 28 percent. High vinyl acetate content EVA copolymers generally produce undesirable foams that are mushy, sticky, have no tear strength, and exhibit excessive amounts of voiding and holes. Previous attempts to cross-link high vinyl acetate content ethylene-vinyl acetate copolymers have met with difficulty. The addition of a maleic anhydride grafted component to a mixture including an EVA allows the use of a high vinyl acetate content EVA in a product. The maleic anhydride permits the material to be cross-linked in a manner that reduces the tackiness and maintains the flexibility of the article in a foamed or non-foamed condition.

In particular, low density closed or open cell EVA foamed articles (e.g., high vinyl acetate content EVA foams) can be prepared and processed when maleic anhydride grafted components are included in the mixture that is cross-linked and expanded. Foams having high densities (over 20 pounds per cubic foot), medium densities (10 to 12 pounds per cubic foot), and low densities (1.5 to 2.0 pounds per cubic foot) can be prepared with these materials. The resultant foams are tough but soft materials that can be utilized as produced. Tough materials have a tensile strength greater than about 45 psi and a tear Die C greater than about 5 psi. Soft materials foams have a durometer Shore OO less than about 50 and a compression deflection less than about 5 psi, preferably less than 3.5 psi, and more preferably less than 3 psi. In addition to having low tackiness and good flexibility, the materials have a greater ability to be dipped (e.g., in a PVC dip coating process), coated, laminated to other materials, or bonded with an adhesive.

The foamed materials including maleic anhydride have several enhanced foam properties. Lower densities can be attained, less blocking and sticking of foam pieces can occur, compression recovery can be improved, resilience can be increased, and improved tensile, tear and elongation properties can be observed. In addition, the foams can have a lower compression deflection than previously achievable without using plasticized materials. The foams have properties that are comparable to polyurethane foams, PVC foams, or elastomeric foams.

Maleic anhydride grafted materials containing EVA are more easily processed than materials that do not include maleic anhydride. The low tackiness of the maleic anhydride material allows continuous sheet production by horizontal and vertical foaming. In addition, additional melt strength can be imparted to the polymer compound which allows foaming to a higher density or to thicker gauges in vertical foaming processes.

Soft foams can shrink near the center of the foam, thereby forming a "dish" or a "sink," which results in a loss of usable material. Foams exhibiting little or no shrinkage near the center of the material reduce the amount of dishing or sinking that occurs. The addition of maleic anhydride to the materials can result in soft foams having thicknesses of five inches or greater with little or no dishing or sinking.

The maleic anhydride can improve the physical properties of foamed articles including components such as colorants or fillers. The maleic anhydride can reduce leaching of colorants or other additives from the material, for example, by increasing the amount of cross-linking in the material.

Other features and advantages of the invention will be apparent from the following detailed description thereof, and from the claims.

DETAILED DESCRIPTION

Polymer articles can be prepared from a mixture including an ethylene-vinyl acetate (EVA) copolymer and a maleic anhydride grafted component. A portion of the mixture is cross-linked. The mixture can be foamed.

The EVA copolymer can have a vinyl acetate content of between about 9 and 60 percent vinyl acetate. Preferably, the vinyl acetate content of the ethylene vinyl acetate copolymer is between 15 and 50 percent. Suitable EVA copolymers can have vinyl acetate (VA) contents of 9 percent, 17 percent, 23 percent, 28 percent, or 40 percent. Commercially available EVA copolymers include AT Polymers 1070C (9% VA), AT Polymers 1710 (17% VA), AT Polymers 2306 (23% VA), AT Polymers 2803 (28% VA), AT Polymers 2810 (28% VA), Chevron/Ace Plastics TD 3401 (9.5% VA), Chevron/Ace Plastics DS 4089-70 (18% VA), DuPont Elvax 40 (40% VA), DuPont Elvax 140-W (33% VA), DuPont Elvax 250-W (28% VA), DuPont Elvax 260 (28% VA), DuPont Elvax 350 (25% VA), DuPont Elvax 360 (25% VA), DuPont Elvax 450 (18% VA), DuPont Elvax 460 (18% VA), DuPont Elvax 550 (15% VA), DuPont Elvax 560 (15% VA), DuPont Elvax 650 (12% VA), DuPont Elvax 660 (12% VA), DuPont Elvax 750 (9% VA), DuPont Elvax 760 (9.3% VA), DuPont Elvax 770 (9.5% VA), Exxon Escorene LD-740 (24.5% VA), Exxon Escorene LD-724 (18% VA), Exxon Escorene LD-721.62 (19.3% VA), Exxon Escorene LD-721.88 (19.3% VA), Exxon Escorene LD-721 (19.3% VA), Exxon Escorene LD-740 (24.5% VA), Exxon Escorene LD-318 (9% VA), Exxon Escorene LD-319.92 (9% VA), Exxon Escorene LD-725, Quantum UE 630-000 (17% VA), Quantum 637-000 (9% VA), Rexene X1903 (10% VA), Rexene X0901 (12% VA), Rexene X0911 (18% VA), and Rexene X0915 (9% VA).

The mixture can include other components, such as polyolefinic polymers or resins, which can alter the physical properties of the article. The components of the mixture can be blended before or after grafting or cross-linking. The polyolefinic polymer can include a low density polyethylene (LDPE), a very low density polyethylene (VLDPE), a linear low density polyethylene (LLDPE), a single site initiated polyethylene (e.g., PE, LDPE, or VLDPE), a polypropylene, a single-site initiated polypropylene, an ethylene-propylene diene monomer (EPDM) copolymer, an ethylene-propylene rubber (EPR), a single-site initiated ethylene-propylene diene monomer copolymer, a single-site initiated ethylene-propylene rubber, a high density polyethylene (HDPE), a polystyrene, a styrene copolymer, an ethylene-styrene interpolymer, a polyacrylonitrile, a polybutadiene, a polyvinylchloride (PVC), a polyvinylidene chloride, a polyvinylfluoride, a polyvinylidene fluoride, a polyvinyl acetate, a polyvinyl alcohol, a polyamide, a polyacrylate (e.g., a polymethyl acrylate or a polymethyl methacrylate), a polychlorotrifluoroethylene, a polytetrafluoroethylene, a cellulose, a polyester, a polyhalocarbon, and copolymers of ethylene with propylene, isobutene, butene, hexene, octene, vinyl chloride, vinyl propionate, vinyl isobutyrate, vinyl alcohol, allyl alcohol, allyl acetate, allyl acetone, allyl benzene, allyl ether, maleic anhydride, ethyl acrylate (EEA), methyl acrylate, acrylic acid, or methacrylic acid and blends or alloys thereof. Preferably, the polyolefinic polymer is a low density polyethylene, a very low density polyethylene, a linear low density polyethylene, a single-site initiated polyethylene, an ethylene-propylene diene monomer copolymer, an ethylene-propylene rubber, a single-site initiated ethylene-propylene diene monomer copolymer, or a single-site initiated ethylene-propylene rubber.

LDPE resins are described, for example, in "Petrothene Polyolefins... A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PES050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA. A commercially available VLDPE is Union Carbide 1085.

Some EPR and EPDM resins are available commercially from Exxon Chemical Company, Houston, Tex., under the tradename Vistalon™, and include Vistalon™ 5800, Vistalon™ 6205, Vistalon™ 7000, Vistalon™ 7500, Vistalon™ 8000, Vistalon™ 2200, Vistalon™ 2504, Vistalon™ 2555, Vistalon™ 2727, Vistalon™ 4608, Vistalon™ 719, Vistalon™ 3708, Vistalon™ 404, Vistalon™ 457, Vistalon™ 503, Vistalon™ 707, and Vistalon™ 878. Other EPDM resins are available commercially from DuPont, Wilmington, Del., under the tradename Nordel™ and include Nordel™ 2522, Nordel™ 2722, Nordel™ 1440, Nordel™ 1470, Nordel™ 1145, Nordel™ 1040, and Nordel™ 1070.

Single-site initiated polyolefin resins are described, for example, in S. -Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322, 728, in W. J. Hodgson, Jr., U.S. Pat. No. 5,206,075, and in F. C. Stehling, et al., WO 90/03414, each of which is incorporated herein by reference. Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage™ and Affinity™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, Dow 8452, Dow 1030, Dow 8950, Dow 8190, and D8130 (or XU583-00-01).

A component of the mixture, such as a polyolefinic polymer or EVA, is grafted with maleic anhydride. Maleic anhydride-grafting of the polyolefinic polymer or polymer blend occurs when a polymer backbone is activated and reacts with maleic anhydride to form the graft. Levels of grafting can be adjusted by varying the amount of maleic anhydride introduced to the polyolefinic polymer or blend. The maleic anhydride-grafting can be carried out in a separate process, or in a continuous blending process.

Maleic anhydride grafting is generally accomplished in the presence of a graft initiator, such as an organic peroxide. Generally during grafting, the graft initiator is included with the maleic anhydride to perform a hydrogen abstraction from the polyolefin resin backbone which initiates grafting of the maleic anhydride to the polymer chain. Alternatively, maleic anhydride can be grafted to a polymer through gamma or ultraviolet irradiation in the presence of a photosensitizer. Grafting yields a polymer containing covalently bonded individual succinic anhydride units formed by the reaction of maleic anhydride with the polymer. Further side reactions can provide cross-linking. Maleic anhydride grafting is described, for example, in Gaylord, "Reactive Extrusion in the Preparation of Carboxyl-Containing Polymers and Their Utilization as Compatibilizing Agents" in *Reactive Extrusion: Principles and Practice*, M. Xanthos, Ed., Carl Hanser Verlag, 1992, Ch. 3, pg. 58, and in U.S. Pat. No. 4,927,888, each of which is incorporated herein by reference.

Maleic anhydride grafted materials can be prepared by reactive compounding of a material such as a polymer resin, maleic anhydride, and a grafting initiator. In general, maleic anhydride is blended with a grafting initiator which can be a peroxide such as dicumyl peroxide. Other suitable peroxides can be selected based on peroxide characteristics such as the decomposition half life at processing temperature and the residence time in the specific reaction process equipment.

The polymer, maleic anhydride and grafting initiator can be added to the feed section of an extruder, melted, mixed and pressurized. Maleic anhydride is a solid at room temperature, and melts to a low viscosity liquid at approximately 132° F. Melted maleic anhydride can be pumped to the reactor or the solid can be preblended with the polymer prior to introduction to the reactor. The reactor can be a screw extruder (e.g., a single screw or twin screw extruder). After grafting is complete, maleic anhydride which is unreacted is removed from the blend. This can be conveniently accomplished by venting the extruder to atmosphere, or, preferably, by using a vacuum, after the reaction has been completed, and prior to passing through the die.

The grafted mixture is then forced through a die forming a strand that can be cooled and chopped into pellets for the next step in the process. Alternatively, a die that immediately chops the strands into pellets upon exiting the die can be used.

Suitable maleic anhydride-grafted materials are also available commercially, for example, from Union Carbide Corporation, Exxon Chemical Company, DuPont Industrial Polymers, or Uniroyal Chemical. Suitable materials include: VLDPE grafted with about 0.9 weight percent maleic anhydride (MAH), such as Union Carbide DEFB 1373NT; VLDPE grafted with about 0.8 weight percent MAH, such as Union Carbide DEFB 1372NT; HDPE grafted materials, such as DuPont Fusabond E MB-100D (0.9% MAH) and Uniroyal Polybond 3009; LLDPE grafted with about 0.9% MAH, such as DuPont Fusabond E MB-226D; LLDPE grafted with about 0.65% MAH, such as DuPont Fusabond E BA-413D; ethylene propylene rubber grafed materials, such as DuPont Fusabond N MF-416D (0.9% MAH) and DuPont Fusabond N MF-418D (0.3% MAH); EPDM grafted materials, such as Exxon Exxelor VA 1801 (semicrystalline, 0.6% MAH graft), Exxon Exxelor VA 1803 (amorphous, 0.7% MAH graft), Exxon Exxelor VA 1810 (semicrystalline, 0.5% MAH graft), Exxon Exxelor VA 1820 (semicrystalline, 0.3% MAH graft), DuPont Fusabond N MF-274D (0.3% MAH), Uniroyal Chemical Royaltuf EDPM 490, and Uniroyal Chemical Royaltuf EDPM 485; polypropylene grafted materials, such as Exxon Exxelor PP1015 (0.4% MAH), DuPont Fusabond P MZ-109D (0.55% MAH), DuPont Fusabond P MZ-353D (1.4% MAH), Uniroyal Polybond 3150, and Uniroyal Polybond 3200; ethylene acrylate terpolymer grafted with about 0.85% MAH, such as DuPont Fusabond A MG-423D; and ethylene vinyl acetate grafted with about 0.8% MAH, such as DuPont Fusabond C MC-190D (28% VA) and DuPont Fusabond C MC-197D (18% VA). The commercial materials can be incorporated into the mixture as substitutes for or in combination with the reactive-compounded materials described above.

The grafted component can include other grafted monomers, such as di- and tri-allyl cyanurates and isocyanurates, alkyl di- and tri-acrylates and methacrylates, zinc dimethacrylates and diacrylates, styrenes, and butadiene.

The maleic anhydride grafted component is blended with EVA and cross-linking agents to form a mixture. Methods of combining the components of the foamable mixture include, for example, melt-blending, diffusion-limited imbibition, or liquid mixing. Any or all of the ingredients can be pulverized or reduced in particle-size by other methods prior to use. Blending can be accomplished by dry blending pellets of the individual components either by batch processes or as a continuous feed processes to an extruder. The components can be mixed, for example, in an internal mixer such as a Banbury mixer, a single or twin screw extruder, or any other mixer capable of providing sufficient heating for melting and fluxing for complete and uniform mixing of the materials (i.e., a laboratory two roll mill). It is preferred that the blending be carried out with temperature control. The blending or mixing provides a uniform mixture. Components can be introduced to the mixture sequentially at any step during the mixing operation. Once mixed, the hot foamable compounded mixture is sheeted, for example, through a two roll mill.

Other resins, foaming agents, and other additives can be included in the mixture. Other additives that can be added to the foam compositions include particulate and fibrous fillers to reinforce, strengthen or modify the rheological properties of the foam composition, antioxidants (e.g., hindered phenolics such as Irganox 1010 or Bennox 1010, phosphites such as Irgafos 168, or polymerized trimethyldihydroquinoline such as Agerite AK, Resin D or Flectol H), ultraviolet stabilizers, thermal stabilizers, antistatic components, flame retardants, pigments, colorants, and other processing aids.

Foaming agents can be included in the mixture to produce foamed articles. The expanding medium, or foaming agent, can include a physical foaming agent or a chemical foaming agent. A physical foaming agent is a medium expanding composition that is a gas at temperatures and pressures encountered during the foam expanding step. Typically, a physical foaming agent is introduced to the polymer blend in the gaseous or liquid state and expands, for example, upon a rapid decrease in pressure.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. The preferred foaming agents include butane, isobutane, carbon dioxide, and 1,1-difluoroethane (HFC-152a). The preferred physical foaming agent concentration prior to expanding the foam is between 0.5 and 30 percent.

A chemical foaming agent is compound or mixture of compounds that decomposes at elevated temperatures to form one or more gasses, which can be used to expand the compositions into a foam. In general, the chemical foaming agent will have a decomposition temperature (with the resulting liberation of gaseous material) from 130° C. to 350° C. Examples of chemical foaming agents include azodicarbonamide, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides. In addition, various acid/bicarbonate mixtures decompose into gasses when heated. The preferred chemical foaming agent concentration prior to expanding the foam is between 2 and 30 percent.

Cross-linking of the mixture can aid in the formation of desirable foamed and non-foamed materials. Cross-linking can also lead to improvements of the ultimate physical properties of the materials, such as flexibility and low tackiness. Cross-linking can take place prior to, during, or after expansion of the foam.

One method of cross-linking is by reaction with a peroxide. Cross-linking can also be accomplished by grafting vinyl silane groups onto a component of the mixture and activating cross-linking by exposing the mixture to moisture. Silane cross-linking can be useful for making thin gauged foamed articles such as tape grade foams. A combination of peroxide and silane cross-linking can also be used. In the case of peroxide, the cross-linking can be accomplished in the beginning zones of a foaming chamber via heat activation or in another heat treatment process. Silane cross-linking can be activated by exposure to a source of moisture, for example, prior to expansion in an oven.

When cross-linking with a peroxide, heating the peroxide causes it to generate radicals which react with the components of the mixture to cause covalent cross-links in the mixture. By regulating the amounts and types of organic peroxide present in the mixture, the relative rates of radical generation, abstraction, and cross-linking steps can be controlled to permit foaming of the polymer materials. The resulting materials have high cross-link levels. Peroxide cross-linking is described in detail in Park, *Handbook of Polymeric Foam and Foam Technology*, "Polyolefin Foam," Ch. 9, pp. 186–242, which is incorporated herein by reference.

Hydrolyzable silanes can be grafted to a component of the mixture to make the mixture cross-linkable by exposure to moisture. Silane-grafted materials are formed by grafting a material such as a polyolefinic polymer to an azido- or vinyl-functional silanes having the general formula $RR'SiY_2$, in which R represents an azido- or vinyl-functional radical attached to silicon through a silicon-carbon bond (e.g., composed of carbon, hydrogen, and optionally sulfur, nitrogen and oxygen), each Y represents a hydrolyzable organic radical (e.g., a radical that can be cleaved from silicon by the addition of water); and R' represents a monovalent hydrocarbon radical or a hydrolyzable organic radical. Suitable vinyl-functional silanes include vinyl-functional alkoxy silanes such as vinyl trimethoxy silane (VTMOS) and vinyl triethoxy silane (VTEOS). Silane grafting is described, for example, in U.S. Ser. No. 08/872,736, filed Jun. 11, 1997, U.S. Pat. No. 5,859,076 which is incorporated herein by reference.

The mixture can also be cross-linked with high-energy, ionizing radiation involve the use of equipment which generates electrons, X-rays, Beta-rays or Gamma-rays. The most preferred method for cross-linking olefinic compositions through exposure to ionizing radiation is through the use of an electron-beam radiation source. Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation.

Regardless of the method of cross-linking used, acceptable foam articles can only be obtained in certain ranges of cross-linking density or level, which is related to the amount of grafting in the blend. Too much cross-linking prior to foaming can render the foam inelastic, resulting in less than optimal expansion and greater than optimal density for a given level of foaming agent. Too little cross-linking can be detrimental to physical properties such as compression set properties or thermal resistance, for example. It is important to choose cross-linking levels that afford foams with particular desired properties. Grafting with maleic anhydride and cross-linking can increase the melt strength of the composition. The cross-linking levels can be determined by establishing the gel content of the of the composition, for example, by extraction with a solvent such as xylenes. The gel content of the foams are preferably in the range of about 10 to about 95 percent, and preferably in the range of about 25 to about 90 percent.

The graft initiator or cross-linking agent can be a radical generating species, for example, a peroxide. Examples of peroxides include dicumyl peroxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy)diisopropylbenzene, 4,4'-bis(t- butylperoxy)butylvalerate, t-butylperbenzoate, t-butylperterephthalate, and t-butyl peroxide. Most preferably, the graft initiator is dicumyl peroxide, such as 40% active dicumyl peroxide (e.g., Luperco 500 40KE).

In a continuous production process, the process steps can be categorized as reactive compounding, blending, extrusion, and cross-linking. The material from the blending step can be extruded using a conventional plastic sheet extrusion line into a prefoamed and uncross-linked sheet. This is accomplished by pumping the melted mixture through a sheet die on the end of the extruder, and passing the extruded sheet through cooling and polishing rolls. The product forms a continuous sheet which is collected in roll form. The maleic anhydride can facilitate cross-linking and handling of the foam material in the solid sheet form.

The article can be cross-linked and/or expanded in a continuous process or a compression molding (e.g., batch) process.

In the continuous process, expansion to form a foam takes place in a foaming chamber of a continuous oven. For example, an extruded sheet can enter a heated chamber of the oven, normally supported on a mesh belt in a horizontal oven or suspended vertically in a vertical oven. The material is heated above the decomposition temperature of the chemical foaming agent contained in the mixture, thereby expanding the material into a foam which exits the oven as a continuous sheet. This process can be used to produce continuous sheets of foam incorporating a high level of EVA resin, for example, up to 40% vinyl acetate. A product containing a 40% vinyl acetate EVA copolymer would normally be too tacky to handle and too soft to convey through the process (i.e., it tends to stick to the belt). The addition of the maleic anhydride can enhance the effects of cross-linking, reduce the tackiness, and improve the strength of the material so that is can be more easily handled and conveyed throughout the process.

In a compression molding (e.g., batch) process, the sheet can be cut, for example, into the a rectangular shaped preform to fill a mold prior to foaming in a mold cavity. The preform is inserted into a the mold cavity in a preheated hydraulic press. More than one mold can be included in the hydraulic press. Once loaded, the hydraulic press is closed. The filled mold is held in the hydraulic press for predetermined press cycle time to begin the cross-linking and expanding process. The time, temperature, and clamping pressure can be modified to afford foams having optimized properties.

Following the completion of the hydraulic pressing cycle, the press is released and the partially cured and expanded material is removed from the press. The partially cured and expanded material is then transported in the mold to a pre-heated secondary expansion press for a second predetermined press cycle (i.e., time, temperature, and clamping pressure that have previously been determined to optimize foam properties) to complete the cross-linking and expansion of the material.

Once the expanding and cross-linking processes are complete, or nearly complete, the foam block (e.g., bun) can be cooled and removed from the secondary expansion press and the mold cavity. Once cooled, the foam block can be washed and allowed to dry.

After cross-linking and expanding the mixture including EVA and maleic anhydride grafted to a component of the mixture, the foam can contain open cells, closed cells, or a combination thereof. The closed cells can be converted to open cells by crushing the foam and allowing the material to recover. The formulation of the foam gives the material the physical properties necessary for recovery. The foam can be crushed manually, mechanically (e.g., with a press), or with a cell crushing apparatus that permits fast material throughput. The crushing device can include a pinning device that punctures closed cells. Pinning can take place before, during, or after crushing. After crushing, the open cell foam can have greater than 50 percent open cells (e.g., up to 98 percent). Conversion of closed cells to open cells is described in more detail, for example, in U.S. Ser. No. 08/872,736, incorporated herein by reference.

Maleic anhydride grafted materials can be used in molding processes to expand a particular form in mold from a mixture containing foaming agents. The non-foamed materials included a maleic-anhydride component can be in the shape of, for example, pellets, granules, chips, powder, fragments, or other small particulates which can enter small crevice areas of a mold. In this process, the expanding and cross-linking step can take place completely in the mold. Alternatively, the molding process can occur in two independent cross-linking and expanding steps. The mixture has sufficient time to flow and foam in difficult to fill cracks and crevices without being so cross-linked as to prevent material flow. The molding process can be used to mold products such as, for example, automotive bumpers, packaging, or footwear from the maleic anhydride grafted materials.

The maleic anhydride grafted materials can be used in injection molding, compression molding, transfer molding, rotational molding, slush molding, injection molding, thermoforming and/or laminating molding, or other types of molding operations. The maleic anhydride grafted materials can also be used to form sheets, including thin, tape grade rolls. Tape grade foams can have thicknesses between about 0.015 and ⅝ inch and densities between about 1.5 and 40 pounds per cubic foot. In addition, the maleic anhydride grafted materials can be used to manufacture of solid sheet materials, cast films, extruded films, extruded coatings, wire and cable, and profile extrusions. In each of these applications, the maleic anhydride grafted materials can be foamed or non-foamed.

The high vinyl acetate content allows the foams to be used in applications which require dipping, coating, lamination, or bonding to adhesives. Dip materials are described, for example, in U.S. Pat. No. 5,021,290.

Maleic anhydride grafting can increase the strength of the foamed article, permitting the use of the foam in applications that require an increase in tensile strength and tear resistance, such as packaging, cushioning, and shock attenuating applications. The open cell foams have good flexibility at low temperatures; the foams can provide cushioning over a broad range of temperatures (i.e., between −90° F. and 200° F.). The foams can be used, for example, in situations where ease in skiving is necessary, such as in producing flotation vests or cushions.

The foams can also be used where a soft foam of greater thickness is required, as the foams can be as large as 10 inches thick (e.g., 2 to 4 inches thick). The softness of the material can be modified by blending other polymers into the mixture before expanding to form a foam while maintaining the strength of the material. Similarly, the foam density can also be varied by adjusting the amount and conditions of the cross-linking and expansion steps.

The following specific examples are to be construed as merely illustrative, and not limitive, of the remainder of the disclosure.

EXAMPLE 1

A foamed article including EVA and maleic anhydride was produced in a compression molding process. A VLDPE resin was grafted with maleic anhydride (MAH) and compounded with other ingredients to give a mixture having the following formulation:

| Formulation Component | Example 1 Parts per hundred resin (PHR) |
| --- | --- |
| VLDPE (grafted with 0.9% MAH) | 10 |
| EVA (28% VA content) | 90 |
| Zinc Oxide | 0.13 |
| Azodicarbonamide | 14 |
| Dicumyl Peroxide 40% | 1.875 |
| Antioxidant | 0.2 |

The grafted polyolefinic resin and EVA were compounded with additional ingredients, including a blowing agent, activators, and an organic peroxide cross-linking agent as indicated in the above formulation. All ingredients were mixed on a two roll mill set at approximately 250° F. Mixing was accomplished by sequential addition of portions of the materials into the polymer. The fluxed and fused mixture was banded on the heated mill roll surface as is customary in mixing in this operation. Alternatively, the components can be mixed using an internal high intensity batch mixer. At the completion of the mixing operation, the hot compounded material was sheeted off the mill at approximately ⅜ inch thickness.

Multiple sheets were plied up (i.e., layered) into a preform for molding in a 1.25 inch×6 inch×6 inch high pressure hydraulic press mold while still hot. The mold containing the hot compound was put between heated high pressure hydraulic press platens under pressure for 50 minutes at 295° F. at 1000 psi. The mold was released and the resulting material was removed from the hydraulic press mold and inserted into a lower pressure mold cavity (i.e., at atmospheric pressure) of the expected final dimensions of 3 inches by 18 inches by 24 inches. The material was allowed to complete cross-linking and expansion in the lower pressure mold cavity for about 30 minutes at 330° F. The mold cavity and foamed material therein was cooled with water to room temperature. The expanded material was removed from the mold, yielding a closed cell foam having the physical properties summarized in Table I.

TABLE I

| Property | Example 1 |
| --- | --- |
| Density (pcf) | 2.04 |
| Tensile (psi) | 50.8 |
| Elongation (%) | 431 |
| 25% Compression Deflection (psi) | 3.26 |
| 50% Compression Deflection (psi) | 9.77 |
| 50% Compression Set (%) (ASTM-3575) | 25 |
| 50% Compression Set (%) (ASTM-1056) | 48 |
| Tear Die C (pli) | 5.8 |
| Durometer Shore A | 0 |
| Durometer Shore C | 0 |
| Durometer Shore 00 | 30 |
| Durometer Shore FWC | 8 |
| Cell size average (mm) | 0.20 |
| Cell size min. (mm) | 0.05 |
| Cell size max. (mm) | 0.40 |

EXAMPLE 2

The method described in Example 1 was used to prepare a foamed article having the following formulation:

| Formulation Component | Example 2 Parts per hundred resin (PHR) |
| --- | --- |
| VLDPE (grafted with 0.9% MAH) | 20 |
| EVA (28% VA content) | 80 |
| Zinc Oxide | 0.2 |
| Azodicarbonamide | 14 |
| Dicumyl Peroxide 40% | 1.75 |
| Antioxidant | 0.2 |

The resulting closed cell foam had a density of 2.34 pounds per cubic foot and a durometer Shore 00 of 36.

EXAMPLE 3

The method described in Example 1 was used to prepare a foamed article having the following formulation:

| Formulation Component | Example 3 Parts per hundred resin (PHR) |
| --- | --- |
| VLDPE (grafted with 0.9% MAH) | 30 |
| EVA (28% VA content) | 70 |
| Zinc Oxide | 0.2 |
| Azodicarbonamide | 14 |
| Dicumyl Peroxide 40% | 1 |
| Antioxidant | 0.2 |

The resulting foam was a closed cell foam.

EXAMPLE 4

The method described in Example 1 was used to prepare foamed articles having the following formulations:

|  | Example 4A | Example 4B | Example 4C |
| --- | --- | --- | --- |
| EVA (28% VA content) | 60 |  | 80 |
| EVA (23% VA content) |  | 80 |  |
| EVA (17% VA content) | 30 |  |  |

-continued

|  | Example 4A | Example 4B | Example 4C |
|---|---|---|---|
| EVA (40% VA content) |  |  | 15 |
| EPDM | 10 | 10 |  |
| VLDPE (grafted with 0.8% MAH) |  |  | 5 |
| Single-site initiated VLDPE |  | 10 |  |
| Azodicarbonamide | 15 | 14 | 20 |
| Zinc oxide | 0.05 | 0.05 | 0.13 |
| dicumyl peroxide | 1 | 1 | 1.2 |
| antioxidant |  | 0.1 | 0.3 |
| clay |  | 10 |  |

The high pressure mold had dimensions of 1.25 inch×6 inch×6 inch. The mold containing the hot compound was put between heated high pressure hydraulic press platens under pressure for 45 minutes at 295° F. at 500 psi. The mold was released and the resulting material was removed from the hydraulic press mold and inserted into a lower pressure mold cavity (i.e., oven). The material was allowed to complete cross-linking and expansion in the lower pressure mold cavity for about 30 minutes at 330° F. The mold cavity and foamed material therein was cooled with water to room temperature.

A dip test procedure was performed on each of the samples. A foam sheet was skived to a thickness of one inch. The one inch thick foam sheet was cut into strips having a width of two inches and a length of twelve inches. A polyvinylchloride (PVC) dip solution was prepared from an acceptable base source, such as Flexibar 821-4019 solvent vinyl scarlet base, available from Flexibar Corporation. The base was mixed until uniform dip solution was formed. The dip solution was maintained at 70±3° F. at a relative humidity of 50 percent and atmospheric pressure.

Each foam strip was held vertically above the dip solution. The lower end of the foam strip was immersed approximately four inches into the dip. The foam strip was removed from the dip solution immediately after placing it in the dip. The dipped foam strip was held over the container of dip solution to permit the excess material to drip off. The wet dipped foam strip was place on a surface in a manner to avoid contacting the dip layer portion of the foam strip. The dip layer was allowed to air dry for about one hour. The dried single layer coated foam strip was dipped a second time following the same procedure. The double dipped foam strip was allowed to air dry for twenty four hours.

The quality of the dip layer was probed using two peel tests. In the cut and peel test, a knife blade was used to slit the dried dipped area, the dip layer was peeled back at knife cut, and the foam was examined for tears in the foam and/or for ease of peeling. In the rub and peel test, a section of the dip layer was rubbed with a thumb for about thirty seconds, the rubbed area (or blister if a blister formed) was peeled back, and the foam was examined for tears in the foam and/or for ease of peeling.

The resulting closed cell foam had the physical properties summarized in Table II.

TABLE II

|  | Example 4A | Example 4B | Example 4C |
|---|---|---|---|
| Density | 2.08 | 2.29 | 1.44 |
| Tensile | 47 | 53.84 | 45 |
| Elongation | 452 | 367 | 337 |
| 25% Compression Deflection | 2.4 | 2.9 | 2.49 |
| 50% Compression Deflection | 7.95 | 8.75 | 8.59 |
| 50% Compression Set | 28.78 | 32.8 | 30.12 |
| Tear Die "C" | 6.7 | 7.96 | 4.92 |
| Split tear | 4.65 | 4.93 |  |
| Shore A Durometer | 0 | 0 | 0 |
| Shore C Durometer | 0 | 0 | 0 |
| Shore 00 Durometer | 18 | 22 | 25 |
| Cell size mode mm | 0.2 | 0.2 | 0.2 |
| Cell size min. mm | 0.05 | 0.05 | 0.05 |
| Cell size max. mm | 0.4 | 0.4 | 0.4 |
| Appearance | few small voids in foam | some voids in foam | fine celled nice foam |
| PVC dip | sticks but can peel off | sticks but can peel off | better bond dip to foam |

EXAMPLE 5

The method described in Example 1 was used to prepare a foamed articles having the following formulations:

|  | Example 5A | Example 5B | Example 5C | Example 5D |
|---|---|---|---|---|
| EVA (28% VA content) |  |  |  | 10 |
| EVA (18% VA content) |  | 80 |  |  |
| EPDM (grafted with 0.7% MAH) |  | 20 | 10 |  |
| EPDM (Uniroyal Chemical Royaltuf EDPM 490, grafted with MAH) |  |  | 10 |  |
| EPDM | 50 |  |  |  |
| VLDPE (grafted with 0.9% MAH) | 10 |  |  |  |
| Single site initiated VLDPE | 40 |  | 90 | 80 |
| Zinc Stearate |  |  | 0.3 |  |
| Azodicarbonamide | 14 | 14 | 14 | 14 |
| p,p'-oxybis(benzenesulfonyl |  |  |  |  |

-continued

|  | Example 5A | Example 5B | Example 5C | Example 5D |
|---|---|---|---|---|
| hydrazide) |  | 0.1 |  | 0.1 |
| Zinc oxide | 0.13 | 0.2 |  | 0.2 |
| dicumyl peroxide 40% | 1 | 1.75 | 2.25 | 1.75 |
| antioxidant | 0.3 | 0.2 |  | 0.2 |

The high pressure mold had dimensions of 1.25 inch×6 inch×6 inch. The mold containing the hot compound was put between heated high pressure hydraulic press platens under pressure for 50 minutes at 295° F. at 1960 psi (60 minutes at 900 psi for Example 5A). The mold was released and the resulting material was removed from the hydraulic press mold and inserted into a lower pressure mold cavity (i.e., oven). The material was allowed to complete cross-linking and expansion in the lower pressure mold cavity for about 30 minutes at 330° F. The mold cavity and foamed material therein was cooled with water to room temperature. The materials were tested by PVC dip coating as described in Example 4.

The resulting foam had the physical properties summarized in Table III.

TABLE III

|  | Example 5A | Example 5B | Example 5C | Example 5D |
|---|---|---|---|---|
| Density (pcf) | 1.90 | 2.08 | 2.33 | 2.04 |
| 25% Compression Deflection | 1.9 |  |  |  |
| 50% Compression Deflection | 7.4 |  |  |  |
| 50% Compression Set | 30 |  |  |  |
| Tear Die "C" | 5.05 |  |  |  |
| Shore 00 Durometer | 20 | 32 | 42 | 38 |
| Cell size mode mm | 0.3 |  |  |  |
| Cell size min. mm | 0.05 |  |  |  |
| Cell size max. mm | 0.6 |  |  |  |
| Appearance | nice foam | nice foam | satisfactory foam, had some voids | satisfactory foam |
| PVC dip | improved dip bond | improved dip bond | satisfactory dip | satisfactory dip |

EXAMPLE 6

Four EVA copolymers having different vinyl acetate contents were used to formulate Example 6A (9% vinyl acetate), Example 6B (17% vinyl acetate), Example 6C (23% vinyl acetate), and Example 6D (28% vinyl acetate). The samples had the following general formulation.

| Component | Weight percent (%) |
|---|---|
| EVA copolymer | 56.3 |
| VLDPE (grafted with 0.8% MAH) | 13 |
| Foaming Agent Compound | 29.3 |
| Dicumyl Peroxide Compound | 1.3 |

The foaming agent compound was 40 percent azodicarbonamide in 60 percent EVA copolymer. In Examples 6A and 6B, the foaming agent was compounded with a 9% vinyl acetate EVA copolymer. In Examples 6C and 6D, the foaming agent was compounded with a 23% vinyl acetate EVA copolymer. The dicumyl peroxide compound was 60% dicumyl peroxide dispersed in an acrylic polymer.

For each example, the materials were dry blended and extruded in a single screw extruder to form a rod having a diameter of about 0.5 inches. The rod was cut to pieces having lengths of approximately four inches. The rods were placed in a circulating hot air oven at a temperature of 450° F. The rods were left in the oven until they fully expanded, as observed visually through an oven window.

Each of Examples 6A–6D produced foams having uniform fine cells. The foams were less tacky and had more hot strength than equivalent foams produced using peroxide cross-linking without containing maleic anhydride. The reduced tackiness and increase hot strength of the foams including maleic anhydride indicates that foams that are normally difficult to handle in a conventional horizontal foaming oven due to sticking to a conveyor belt and structural weakness can be processed effectively by including maleic anhydride.

EXAMPLE 7

Samples having the following formulations were prepared.

| Component | Example 7A | Example 7B | Example 7C |
|---|---|---|---|
| | Weight percent (%) | | |
| Silane grafted EVA Copolymer (9% VA) | 61.5 | 67.5 | 57.5 |
| Catalyst Compound | 3.5 | 3.5 | 3.5 |
| Foaming Agent Compound | 15.5 | 15.5 | 15.5 |
| EVA resin (23% VA) | 11.0 | | |
| VLDPE (grafted with 0.8% MAH) | | 5.0 | 5.0 |
| Activator Compound | 6.0 | 6.0 | 6.0 |
| White Color Concentrate | 2.5 | 2.5 | 2.5 |

Example 7A was a control sample that did not contain maleic anhydride. The EVA resin added to Example 7A had a VA content from 5% to 50% to regulate overall VA level in the product.

The silane grafted EVA copolymer was prepared by grafting Exxon LD319 (9% VA content) with 0.37 percent vinyl trimethoxysilane (VTMOS) using dicumyl peroxide as the grafting initiator (20:1 VTMOS:dicumyl peroxide). The catalyst compound was 1.2 percent dibutyltin dilaurate in LDPE. The catalyst compound included 1 percent of a phenolic antioxidant (Irganox 1010). The foaming agent compound was 40 percent azodicarbonamide in LDPE. The activator compound was 30 percent zinc salt (10 percent zinc oxide and 20 percent zinc stearate) in LDPE. The white color concentrate was 50 percent $TiO_2$ in LDPE.

The formulation was dry blended and extruded into a sheet using a 2.5 inch extruder. The resultant sheet had a thickness of between 0.025 to 0.027 inches and a width of 8.1 inches. The extrusion temperature was maintained below 280° F. to avoid prefoaming of the sheet as it exits the die.

The extruded sheet was cross-linked by exposure to moisture in a condensing atmosphere at 150° F. wet bulb temperature for a period of 16 hours. The cross-linked sheet was foamed by passing through a chamber where it was exposed on both surfaces to a combination of infrared and hot air heating. The temperature of the sheet was raised to about 450° F., which activated the foaming agent and caused the material to expand.

The properties of the foams are summarized in Table IV.

TABLE IV

| | Example 7A | Example 7B | Example 7C |
|---|---|---|---|
| Density (pcf) | 4.8 | 5.1 | 4.8 |
| 50% Compression Set | 20 | 18 | 20 |
| Cell size mode (mm) | 0.2 | 0.2 | 0.3 |

The foamed articles can also be produced by crosslinking the extruded sheet with radiation from sources including electron beam with absorbed doses between about 0.1 and 50 MRAD, preferably between about 1 and 8 MRAD.

The thin foamed articles of Example 7 can be useful in adhesive coating where the additional polarity of the maleic anhydride can improve bonding of the foam to the adhesive.

EXAMPLE 8

The non-foamed articles were prepared having the following formulations:

| | Example 8A | Example 8B | Example 8C |
|---|---|---|---|
| VLDPE | 5 | | |
| VLDPE (grafted with 0.9% MAH) | | | 5 |
| EVA (40% VA content) | 15 | 15 | 15 |
| EVA (28% VA content) | 80 | 80 | 80 |
| Dicumyl peroxide 40% | 3 | 3 | 3 |
| Antioxidant | 0.3 | 0.3 | 0.3 |

The materials were compounded under laboratory conditions using a laboratory scale two roll open mill at a temperature of about 250° F. The compounded material was removed from the mill as 0.25 inch thick square sheets (6 inches by 6 inches). The minimum torque of mixing for Example 8A was 686, for Example 8B was 665, and for Example 8C was 656.

While the material was hot, it was place in to a preheated high pressure mold cavity having dimensions of 0.25 inch×6 inch×6 inch. The mold containing the hot compound was put between heated high pressure hydraulic press platens under pressure for 30 minutes at 295° F. at 900 psi. The mold was released and the resulting material was removed from the hydraulic press mold. The material was cooled to room temperature in air.

Each formulation of Example 8 yielded a translucent, solid cross-linked sheet. The material of Example 8A was slightly tacky and had a Durometer A of 76. The material of Example 8B was slightly tacky and had a Durometer A of 72. The material of Example 8C, which included a maleic anhydride grafted component, was not tacky, was easy to process (e.g., milling produced the lowest torque). The material of Example 8C was softer than that of Example 8A or Example 8B, having a Durometer A of 69.

Other embodiments are within the claims.

What is claimed is:

1. A method of making a non-foamed polymer article comprising:
    providing a mixture including maleic anhydride and an ethylene-vinyl acetate copolymer having a vinyl acetate content between about 9 and about 60 percent, the maleic anhydride being grafted to a portion of the mixture; and
    cross-linking the mixture sufficiently to form a flexible article having low tackiness.

2. The method of claim 1, wherein the mixture further comprises a polyolefinic polymer.

3. The method of claim 2, wherein the polyolefinic polymer is grafted with maleic anhydride.

4. The method of claim 2, further comprising grafting maleic anhydride to the polyolefinic polymer.

5. The method of claim 2, wherein the polyolefinic polymer is selected from the group consisting of a low density polyethylene, a very low density polyethylene, a linear low density polyethylene, a single-site initiated polyethylene, an ethylene-propylene diene monomer copolymer, an ethylene-propylene rubber, a single-site initiated ethylene-propylene diene monomer, and a single-site initiated ethylene-propylene rubber.

6. The method of claim 1, wherein the ethylene-vinyl acetate copolymer is grafted with maleic anhydride.

7. The method of claim 1, further comprising grafting maleic anhydride to the ethylene-vinyl acetate copolymer.

8. The method of claim 1, wherein cross-linking includes cross-linking with a peroxide.

9. The method of claim 8, wherein the peroxide is dicumyl peroxide.

10. The method of claim 1, wherein cross-linking includes cross-linking with a silane.

11. The method of claim 1, wherein cross-linking includes cross-linking with radiation.

12. The method of claim 1, further comprising applying a coating, an adhesive, or a laminated layer to a surface of the article.

13. The method of claim 1, further comprising dipping the article to form a layer on a surface of the article.

14. A non-foamed article comprising a mixture including an ethylene-vinyl acetate copolymer having a vinyl acetate content between about 9 and about 60 percent, and maleic anhydride grafted to a component of the mixture, wherein the mixture is cross-linked sufficiently to provide a flexible article having low tackiness.

15. The non-foamed article of claim 14, wherein the vinyl acetate content of the ethylene-vinyl acetate copolymer is between about 9 and about 60 percent.

16. The non-foamed article of claim 14, wherein the mixture further comprises a polyolefinic polymer.

17. The non-foamed article of claim 16, wherein the polyolefinic polymer is grafted with maleic anhydride.

18. The non-foamed article of claim 17, wherein the article includes between about 1 and about 90 weight percent of the maleic anhydride grafted polyolefinic polymer.

19. The non-foamed article of claim 17, wherein the article includes between about 5 and about 30 weight percent of the maleic anhydride grafted polyolefinic polymer.

20. The non-foamed article of claim 17, wherein the maleic anhydride content of the grafted polyolefinic polymer is between about 0.01 and about 10 weight percent.

21. The non-foamed article of claim 17, wherein the maleic anhydride content of the grafted polyolefinic polymer is between about 0.5 and about 2.0 weight percent.

22. The non-foamed article of claim 14, wherein the vinyl acetate content of the ethylene-vinyl acetate copolymer is between about 15 and about 50 percent.

23. The non-foamed article of claim 14, wherein the portion of the mixture is cross-linked by a peroxide.

24. The non-foamed article of claim 14, wherein the portion of the mixture is cross-linked by a silane.

25. The non-foamed article of claim 14, wherein cross-linking includes cross-linking with radiation.

26. The non-foamed article of claim 14, wherein the article further comprises a surface having a layer formed by dipping.

27. The non-foamed article of claim 14, wherein the article further comprises a surface having a coating, a laminated layer, or an adhesive.

28. The non-foamed article of claim 16, wherein the polyolefinic polymer is selected from the group consisting of a low density polyethylene, a very low density polyethylene, a linear low density polyethylene, a single-site initiated polyethylene, an ethylene-propylene diene monomer copolymer, an ethylene-propylene rubber, a single-site initiated ethylene-propylene diene monomer copolymer, and a single-site initiated ethylene-propylene rubber.

29. The non-foamed article of claim 14, wherein the ethylene-vinyl acetate copolymer is grafted with maleic anhydride.

30. A non-foamed article comprising a mixture including an ethylene-vinyl acetate copolymer having a vinyl acetate content between about 9 and about 60 percent, and a maleic anhydride grafted polyolefinic polymer, wherein the mixture is cross-linked sufficiently to provide a flexible article having low tackiness.

31. The article of claim 30, wherein the vinyl acetate content of the ethylene-vinyl acetate copolymer is between about 9 and about 60 percent.

32. The article of claim 30, wherein the vinyl acetate content of the ethylene-vinyl acetate copolymer is between about 15 and about 50 percent.

33. The article of claim 30, wherein the article includes between about 1 and about 90 weight percent of the maleic anhydride grafted polyolefinic polymer.

34. The article of claim 30, wherein the article includes between about 5 and about 30 weight percent of the maleic anhydride grafted polyolefinic polymer.

35. The article of claim 30, wherein the maleic anhydride content of the grafted polyolefinic polymer is between about 0.01 and about 10 weight percent.

36. The article of claim 30, wherein the maleic anhydride content of the grafted polyolefinic polymer is between about 0.5 and about 2.0 weight percent.

37. The article of claim 30, wherein the portion of the mixture is cross-linked by a peroxide.

38. The article of claim 30, wherein the portion of the mixture is cross-linked by a silane.

39. The article of claim 30, wherein cross-linking includes cross-linking with radiation.

40. The article of claim 30, wherein the article further comprises a surface having a layer formed by dipping.

41. The article of claim 30, wherein the article further comprises a surface having a coating, a laminated layer, or an adhesive.

42. The article of claim 30, wherein the polyolefinic polymer is selected from the group consisting of a low density polyethylene, a very low density polyethylene, a linear low density polyethylene, a single-site initiated polyethylene, an ethylene-propylene diene monomer copolymer, an ethylene-propylene rubber, a single-site initiated ethylene-propylene diene monomer copolymer, and a single-site initiated ethylene-propylene rubber.

43. The article of claim 30, wherein the ethylene-vinyl acetate copolymer is grafted with maleic anhydride.

44. The article of claim 30, wherein the mixture is foamable.

* * * * *